(12) United States Patent
Elfström et al.

(10) Patent No.: US 12,739,488 B2
(45) Date of Patent: Sep. 15, 2026

(54) METHOD AND STRUCTURE FOR IMAGE SENSOR ATTACHMENT

(71) Applicant: Axis AB, Lund (SE)

(72) Inventors: Thomas Elfström, Lund (SE); Arvid Wendel, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 19/202,354

(22) Filed: May 8, 2025

(65) Prior Publication Data

US 2025/0373920 A1 Dec. 4, 2025

(30) Foreign Application Priority Data

Jun. 4, 2024 (EP) .................................... 24179807

(51) Int. Cl.
*H04N 23/54* (2023.01)
*G02B 7/02* (2021.01)
*H04N 23/55* (2023.01)

(52) U.S. Cl.
CPC ............. *H04N 23/54* (2023.01); *G02B 7/022* (2013.01); *G02B 7/026* (2013.01); *H04N 23/55* (2023.01)

(58) Field of Classification Search
CPC ........ H04N 23/54; H04N 23/55; G02B 7/022; G02B 7/026; H05K 1/181
See application file for complete search history.

(56) References Cited

U.S. PATENT DOCUMENTS 5,731,834 A * 3/1998 Huot ...................... H04N 23/54 348/340
2011/0115918 A1* 5/2011 Webster .................. G02B 7/02 348/E5.09
2016/0100082 A1* 4/2016 Schack .................... G02B 7/02 219/121.64
2020/0204711 A1 6/2020 Guidi et al.
2022/0094826 A1 3/2022 Moehrle
2022/0334461 A1 10/2022 Alm
2023/0319382 A1 10/2023 Shin et al.

FOREIGN PATENT DOCUMENTS

CN 108202481 B 5/2019

OTHER PUBLICATIONS

Extended European Search Report, European Patent Application No. 24179807.3, dated Nov. 27, 2024.

* cited by examiner

*Primary Examiner* — Lin Ye
*Assistant Examiner* — Steven Daniel Barry
(74) *Attorney, Agent, or Firm* — Volpe Koenig

(57) ABSTRACT

A method for attaching an image sensor to an optics unit of an imaging device, wherein an attachment part is releasably attached to a sensor attachment surface of the optics unit and the image sensor is releasably attached to a sensor holder. Using an active alignment method, a position of at least one of the image sensor and the optics unit is adjusted, such that the image sensor is positioned at a desired angle in relation to an optical axis of the optics unit and in a desired position in relation to the optics unit, thereby positioning the image sensor in an aligned position. The sensor holder is permanently attached to the attachment part, such that the image sensor is fixed in the aligned position. The image sensor is releasable from the sensor holder when the sensor holder has been permanently attached to the attachment part.

12 Claims, 5 Drawing Sheets

METHOD AND STRUCTURE FOR IMAGE SENSOR ATTACHMENT

TECHNICAL FIELD

The present invention relates to imaging devices and more particularly to alignment of an image sensor with an optics unit of an imaging device, such as a camera.

BACKGROUND

An imaging device, such as a network camera or other kind of digital camera, comprises an optics unit and an image sensor for capturing images. The optics unit is often somewhat imprecisely referred to as a lens, even though it is generally comprised of more components than just the lens and may very well comprise two or more lenses.

In the imaging device, it is necessary to align the image sensor with the lens in order to get well-focused images. If the distance between the image sensor and the lens is not correct or if the angle between the image sensor and the optical axis of the lens is not correct, images captured by the image sensor may be wholly or partially out of focus. Thus, the image sensor needs to be arranged in the correct position and orientation in relation to the lens.

Two main types of sensor alignment methods are used. One is so-called passive alignment, which means that the sensor is aligned with the lens using mechanical guiding features determining the position and orientation of the image sensor. Such mechanical features may, e.g., be frames or screw holes defining where and at what angle the image sensor is attached. Passive sensor alignment may often provide a fast and cost-efficient alignment. However, the precision of the alignment is dependent on the tolerances in manufacturing the mechanical guiding features. If requirements on the precision in alignment are high, it may be very costly to maintain manufacturing tolerances fulfilling those precision requirements.

If a very precise alignment is required, it may in many cases be beneficial to instead use active sensor alignment. In an active alignment process, image sensor feedback is used while adjusting the image sensor in relation to the lens. Once a satisfactory image is obtained, the image sensor is fixed in position and orientation in relation to the lens using a permanent fixation method, such as UV-curing or heat-curing glue. Some active sensor alignment methods use laser welding (see, e.g., applicant's European patent No. 3 002 619). Alternatively, the image sensor may be fixed in position using a less permanent fixation, such as by means of screws, but this may make it more difficult to ensure that the image sensor is kept in the aligned position over time. Although active sensor alignment processes may provide high accuracy, they are generally more expensive than passive alignment methods, as they require expensive equipment. Furthermore, once the actively aligned image sensor has been permanently fixed in place, it is difficult to remove the image sensor without damaging the sensor or the lens or both. Such removal or reworking may sometimes be necessary, e.g., when blemishes appear on the image sensor after alignment and permanent attachment. Blemishes may, for instance, be caused by metal particles being rubbed off from threads of the lens. Reworking may also be necessary when it is found that the alignment is incorrect or that one or more components of the imaging device do not work as intended.

There is thus a need for improved methods of attaching an image sensor to an optics unit of an imaging device, such as a camera.

An example of attachment of an image sensor in a scanner may be found in U.S. Pat. No. 5,731,834. In this scanner, a CCD array is optically aligned to a CCD array nest and affixed thereto to form a replaceable subassembly. The CCD array nest has an outwardly facing statically determinate or exactly constrained interface mounting surface. A carrier plate with the CCD array assembly removably attached thereto is optically aligned to and affixed to a barrel frame and lens assembly. The subassembly is removably attachable to the carrier plate allowing replacement of a failed CCD array without additional alignment.

SUMMARY OF THE INVENTION

It is an object of the present invention to provide a method for attaching an image sensor to an optics unit of an imaging device, such as a camera, which makes it possible to securely attach the image sensor in an aligned position while also enabling reworking of the attachment.

A further object is to provide a method for attaching an image sensor to an optics unit of an imaging device which may reduce the cost of reworking.

It is also an object of the present invention to provide an imaging device in which an image sensor can be attached securely in an aligned position in relation to an optics unit in a manner that allows reworking at a reduced cost.

Yet another object is to provide a kit of parts for attaching an image sensor to an optics unit of an imaging device enabling secure attachment and reworking at a reduced cost.

According to the invention, these objects are achieved by a method, an imaging device, and a kit of parts as defined in the independent claims, embodiments and variants thereof being defined in the dependent claims.

Thus, according to a first aspect, the above-mentioned objects are achieved, in full or at least in part, by a method for attaching an image sensor to an optics unit of an imaging device, the method comprising the steps of: releasably attaching an attachment part to a sensor attachment surface of the optics unit, releasably attaching the image sensor to a sensor holder, wherein the sensor holder is positioned in relation to the image sensor by abutting an image sensor abutment surface of the image sensor against a sensor holder abutment surface of the sensor holder, the image sensor abutment surface being a circumferential surface of the image sensor, using an active alignment method, adjusting a position of at least one of the image sensor and the optics unit, such that the image sensor is positioned at a desired angle in relation to an optical axis of the optics unit and in a desired position in relation to the optics unit, thereby positioning the image sensor in an aligned position, permanently attaching the sensor holder to the attachment part, such that the image sensor is fixed in the aligned position, wherein the sensor holder is releasable from the sensor holder when the sensor holder has been permanently attached to the attachment part. By such a method, combining releasable attachment of the attachment part to the optics unit and the image sensor to the sensor holder with permanent attachment of the sensor holder to the attachment part, and arranging the sensor holder such that the image sensor is still releasable when the sensor holder has been permanently attached to the attachment part, it is possible to remove the image sensor from the optics unit without damage to either the image sensor or the optics unit if this proves necessary. In this manner, it is possible to reuse an expensive optics unit even if blemishes have appeared on the image sensor. Similarly, optics units and image sensors can be reused even if it is discovered that they have been attached in an incorrect relative position. Thereby, manufacturing costs can be saved, and environmental impact can be reduced. By using a direct abutment between the image sensor and the sensor holder, tolerance chains can be shortened, thereby enabling good precision.

As used herein, "releasably attaching" means that after attachment, the attached parts can once more be taken apart without damage. On the other hand, "permanently attaching" means that after attachment, the attached parts cannot be taken apart without damage.

An "imaging device" may be a camera or any other kind of device capable of capturing images by means of an optics unit and an image sensor. Non-limiting examples of other imaging devices are scanners, endoscopes, and microscopes.

Positioning the image sensor in a desired position in relation to the optics unit may comprise positioning the image sensor at a desired distance from the optics unit and in a desired translational position in a plane of the image sensor.

In some variants of the method, releasably attaching the image sensor to the sensor holder comprises releasably attaching the sensor holder to a side of the image sensor arranged to face the optics unit. This is a convenient way of making the image sensor accessible for removal even after the sensor holder has been permanently attached to the attachment part.

The attachment part may be attached to the optics unit by means of screws, snap fit, or a spring biased attachment device. Such attachment means provide a practical and inexpensive way of attaching the attachment part to the optics unit.

The image sensor may be carried by a PCB and the sensor holder may be attached to the image sensor by releasably attaching the image sensor PCB to the sensor holder. Attaching a PCB carrying the image sensor to the sensor holder may in many situations be less complicated than directly attaching the image sensor to the sensor holder. The PCB may sometimes be referred to as a PCBA, i.e., a PCB with assembled components.

In some variants of the method, the image sensor is attached to the sensor holder using a spring biased attachment device. Spring biasing may provide an uncomplicated attachment and release of the image sensor.

In some variants of the method, permanently attaching the sensor holder to the attachment part comprises gluing or welding a sensor attachment feature of the sensor holder to an optics attachment feature of the attachment part.

The sensor attachment feature may comprise a through hole or recess in the sensor holder, and the optics attachment feature may comprise a protrusion on the attachment part. By use of a through hole or recess in the sensor holder and a protrusion of the attachment part, attachment of the sensor holder to the attachment part may be simplified.

According to a second aspect, the above-mentioned objects are achieved, in full or at least in part, by an imaging device comprising: an image sensor, an optics unit, an attachment part releasably attached to a sensor attachment surface of the optics unit, a sensor holder to which the image sensor is releasably attached, wherein the sensor holder is permanently attached to the attachment part, such that the image sensor is fixed in an aligned position in relation to the optics unit, and the image sensor holder is releasable from the sensor holder when the sensor holder is permanently attached to the attachment part, wherein the sensor holder is positioned in relation to the image sensor by abutting an image sensor abutment surface of the image sensor against a sensor holder abutment surface of the sensor holder, the image sensor abutment surface being a circumferential surface of the image sensor. With such an imaging device, reworking is enabled, such that the image sensor can be removed from the optics unit without damaging the image sensor or the optics unit.

In some embodiments, the sensor holder is arranged between the image sensor and the optics unit. Hereby, the image sensor may be easily accessible for removal also after the sensor holder has been permanently attached to the attachment part of the optics unit.

The attachment part may comprise a plurality of screw holes for releasable attachment to the sensor attachment surface of the optics unit, and the sensor holder may comprise a plurality of grip surfaces for releasable attachment to the image sensor.

The attachment part may comprise a protrusion and the sensor holder may comprise a through hole or recess, the protrusion being arranged in the through hole or recess and permanently attached thereto. Such an arrangement may provide an uncomplicated way of securely attaching the sensor holder to the attachment part.

In some embodiments of the imaging device, the sensor holder is attached to the attachment part by gluing or welding. Gluing and welding are well-known methods for permanent attachment.

The imaging device of the second aspect may generally be embodied in the same ways as the method of the first aspect with accompanying advantages.

According to a third aspect, the above-mentioned objects are achieved by means of a kit of parts for attaching an image sensor to an optics unit of an imaging device, the kit comprising: an attachment part arranged for releasable attachment to a sensor attachment surface of an optics unit of an imaging device, a sensor holder arranged for releasable attachment to an image sensor of the imaging device, the attachment part and the sensor part being arranged for permanent attachment to each other, and the sensor holder being arranged to be releasable from the image sensor when the attachment part and the sensor have been permanently attached to each other. Such a kit of parts enables the method for attaching an image sensor to an optics unit of an imaging device according to the first aspect and enables attachment of the image sensor to the optics unit of an imaging device according to the second aspect.

The kit of parts of the third aspect may generally be embodied in the same ways as the method of the first aspect and the imaging device of the second aspect with accompanying advantages.

A further scope of applicability of the present invention will become apparent from the detailed description given below. However, it should be understood that the detailed description and specific examples, while indicating preferred embodiments of the invention, are given by way of illustration only, since various changes and modifications within the scope of the claims will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word “comprising” does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Before going into a description of embodiments of the invention, prior art solutions and the problems associated with them will be discussed with reference to FIGS. 1 and 2.

Figure 1:
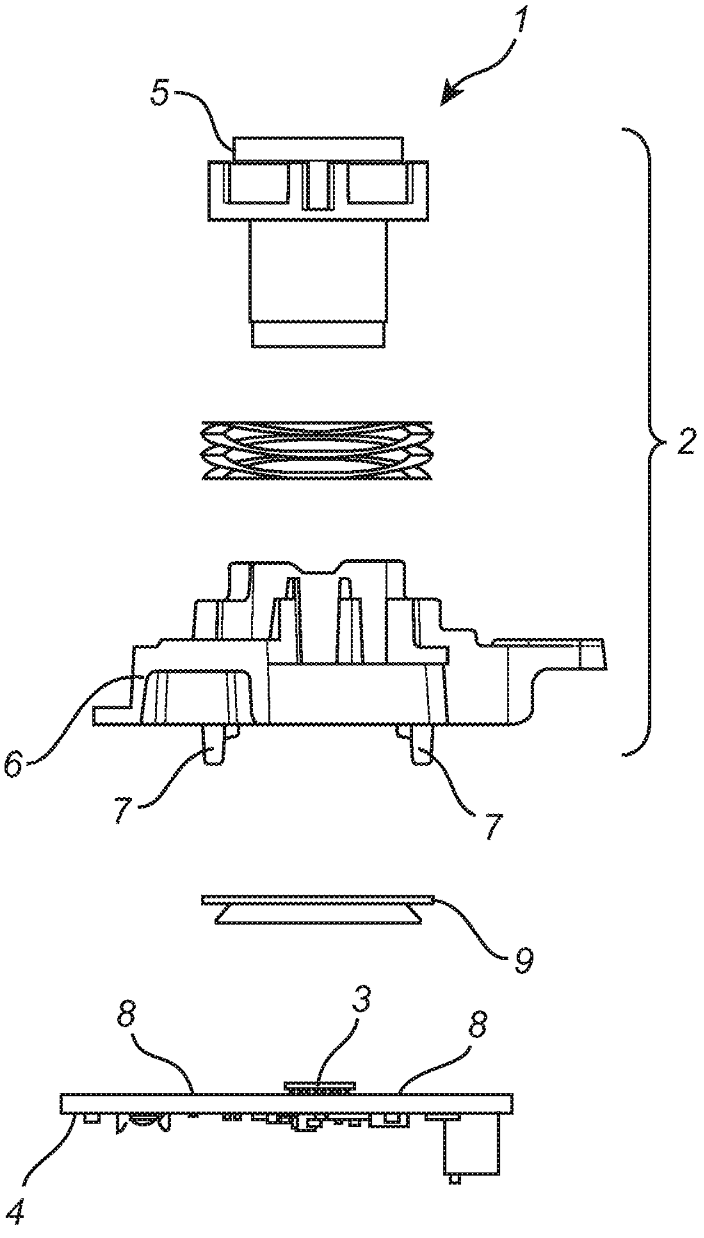
FIG. 1 is a diagram of a prior art attachment of an image sensor to an optics unit of an imaging device, such as a camera.

FIG. 1 shows parts of a first prior art camera 1 having an optics unit 2 and an image sensor 3. The image sensor 3 is carried by a PCB 4 onto which the image sensor 3 has been soldered. The optics unit 2 comprises a lens 5 and a lens holder 6 into which the lens 5 is threadedly engaged. The lens holder 6 has pins 7 arranged to be inserted in matching openings 8 in the PCB 4. A gasket 9 is arranged to be placed between the PCB 4 and the lens holder 6 for sealing around the image sensor 3.

When manufacturing the camera 1, the pins 7 of the lens holder 6 are inserted in the openings in the PCB 4. The image sensor 3 needs to be aligned with the optics unit 2 in order to ensure well-focused images. The distance between the image sensor 3 and the lens 5 needs to be correct, as well as the angle of the image sensor 3 to an optical axis O-O of the lens 5. The pins 7 and the openings 8 therefore have some room for adjustment, such that the relative position of the image sensor 3 and the optics unit 2 can be slightly adjusted. Here, an active alignment method is used. This active alignment method makes use of image data from the image sensor 3 during adjustment of the relative position of the image sensor and the optics unit 2. When the image sensor 3 and the optics unit have been adjusted to a relative position in which a satisfactory image is obtained, the pins 7 of the lens holder 6 are glued to the PCB 4, such that the aligned position is maintained. UV-curing glue may be used to this end.

During testing or later use of the camera 1, unfortunately, blemishes on the image sensor 3 may appear, causing defects in images. As noted in the background section, blemishes may be caused by metal particles rubbed off from the threads of the lens or the lens holder. Image defects may also be caused by incorrect fixation of the image sensor to the optics unit or to the PCB, or by damaged components. It may therefore sometimes be necessary to rework the attachment of the image sensor 3 to the optics unit 2. Thus, the image sensor 3 may need to be removed from the optics unit 2. However, due to the permanent nature of the attachment of the sensor PCB 4 to the lens holder 6, it often proves impossible to remove the image sensor 3 without damaging the image sensor 3, the optics unit 2, or both. For imaging devices with expensive components, particularly advanced lenses and large image sensors, scrapping parts leads to cost increases. In some cases, it may be possible to reuse the image sensor even if the sensor PCB has been damaged in the removal process but in other cases, the image sensor may also be damaged. In prior art imaging devices of the type shown in FIG. 1, it will usually be possible to break apart the lens holder 6 and the sensor PCB 4 without damaging the lens. Still, lenses of the type that are screwed into a lens holder are generally not of the most expensive kind, whereas scrapping image sensors may add considerable cost.

Figure 2:
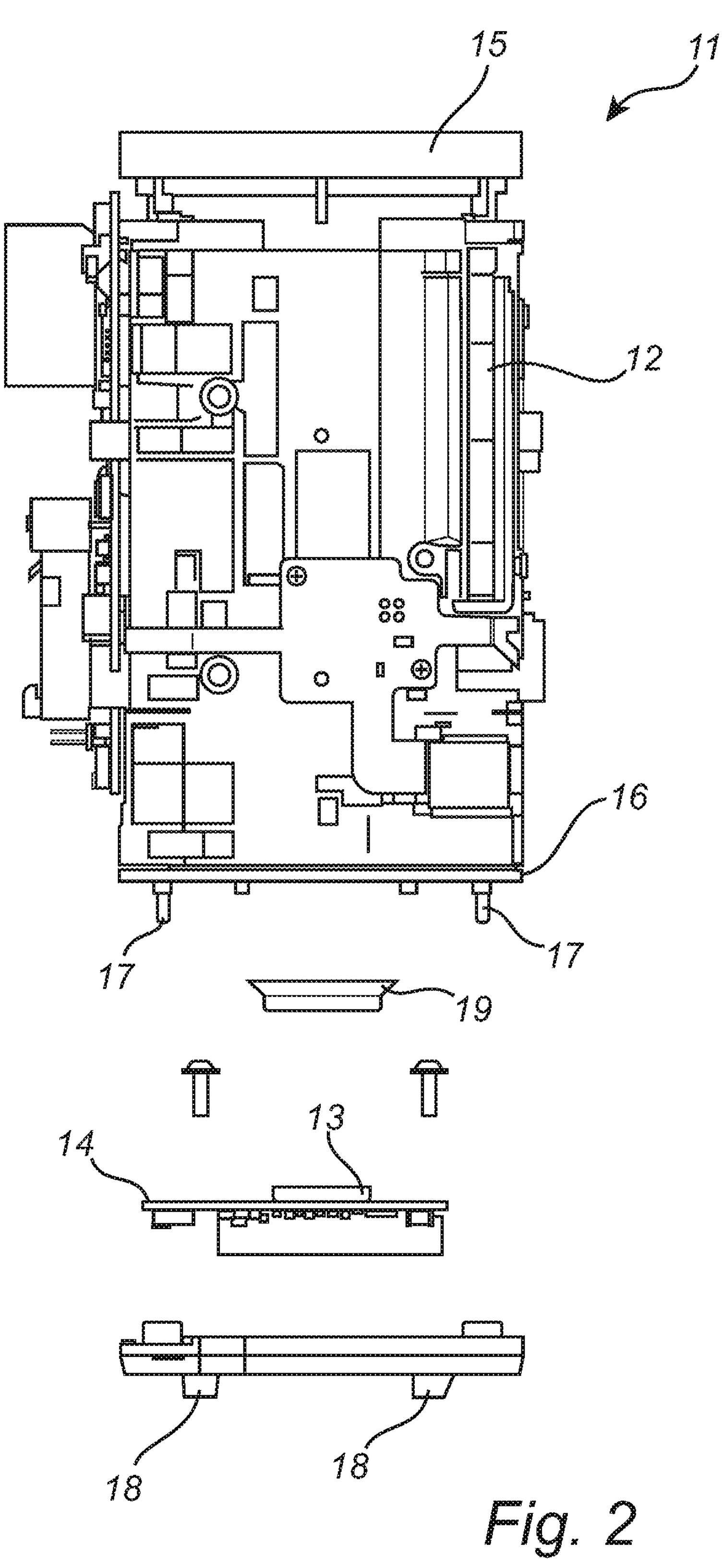
FIG. 2 is a diagram of another prior art attachment of an image sensor to an optics unit.

FIG. 2 shows part of another prior art camera 11. Similar to the prior art camera 1 in FIG. 1, this prior art camera 11 has an optics unit 12 and an image sensor 13 carried by a PCB 14. The optics unit 12 differs from the one shown in FIG. 1 in that the lens 15 is integrated in a larger package rather than screwed into a lens holder. An attachment plate 16 with pins 17 is screwed or riveted onto the back end of the optics unit 12. Instead of just openings in the PCB 14, the PCB 14 in this prior art camera 11 has glue cups 18 into which the pins 17 of the optics unit 12 are inserted during manufacture. Glue, preferably UV-curing, is injected into the glue cups before or after the pins 17 have been inserted. A gasket 19 is arranged to seal around the image sensor 13 between the PCB 14 and the optics unit 12. Using an active alignment process, the image sensor 13 is adjusted in relation to the optics unit, such that a satisfactory image is obtained. Once a desired alignment has been achieved, the glue is hardened by application of UV radiation, such that the image sensor 13 is securely fastened in the aligned position. Just as with the prior art camera 1 shown in FIG. 1, reworking of the attachment of the components of the prior art camera 11 shown in FIG. 2 is sometimes necessary due to sensor blemishes, component malfunction, or incorrect alignment. Such reworking comes with the same problems as with the first-described prior art camera, i.e., the optics unit 12, the image sensor 13, or both may be damaged in the process.

One way of overcoming the problem of the lens and/or image sensor being damaged by reworking would be to use only passive alignment, attaching the image sensor to the optics unit using detachable means, such as screws. As noted in the background section, this may however be unfeasible as it places high demands on manufacturing tolerances. The cost of stricter tolerances may outweigh the possible savings from reduced scrapping.

Another way of avoiding the problem would be to combine active alignment with non-permanent attachment of the parts when the desired aligned position has been achieved. However, the non-permanent nature of such attachment may lead to misalignment of the image sensor and lens with time, particularly if the camera is subjected to vibrations.

Figure 3:
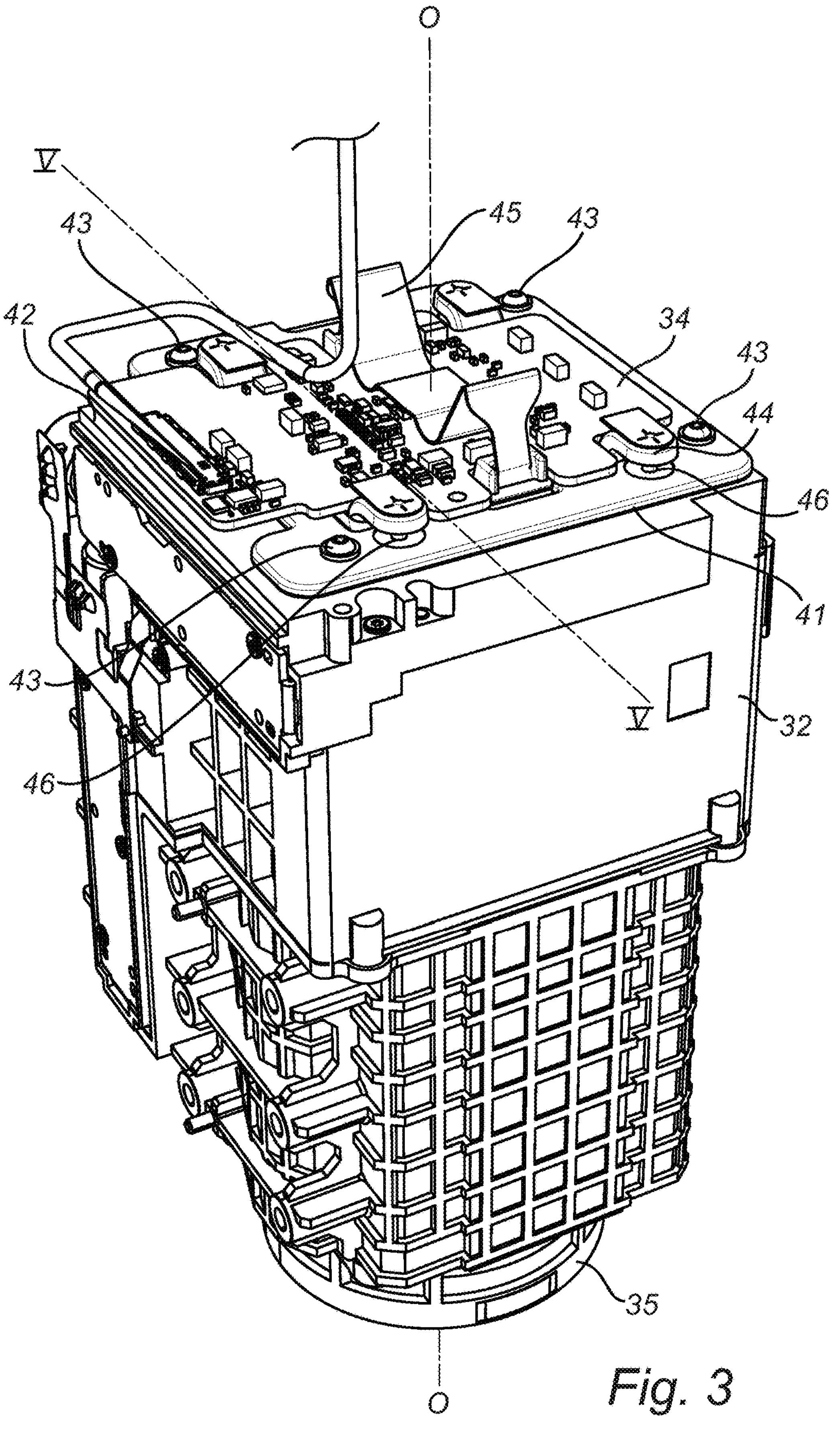
FIG. 3 is a perspective view of parts of an embodiment of an imaging device.
Figure 4:
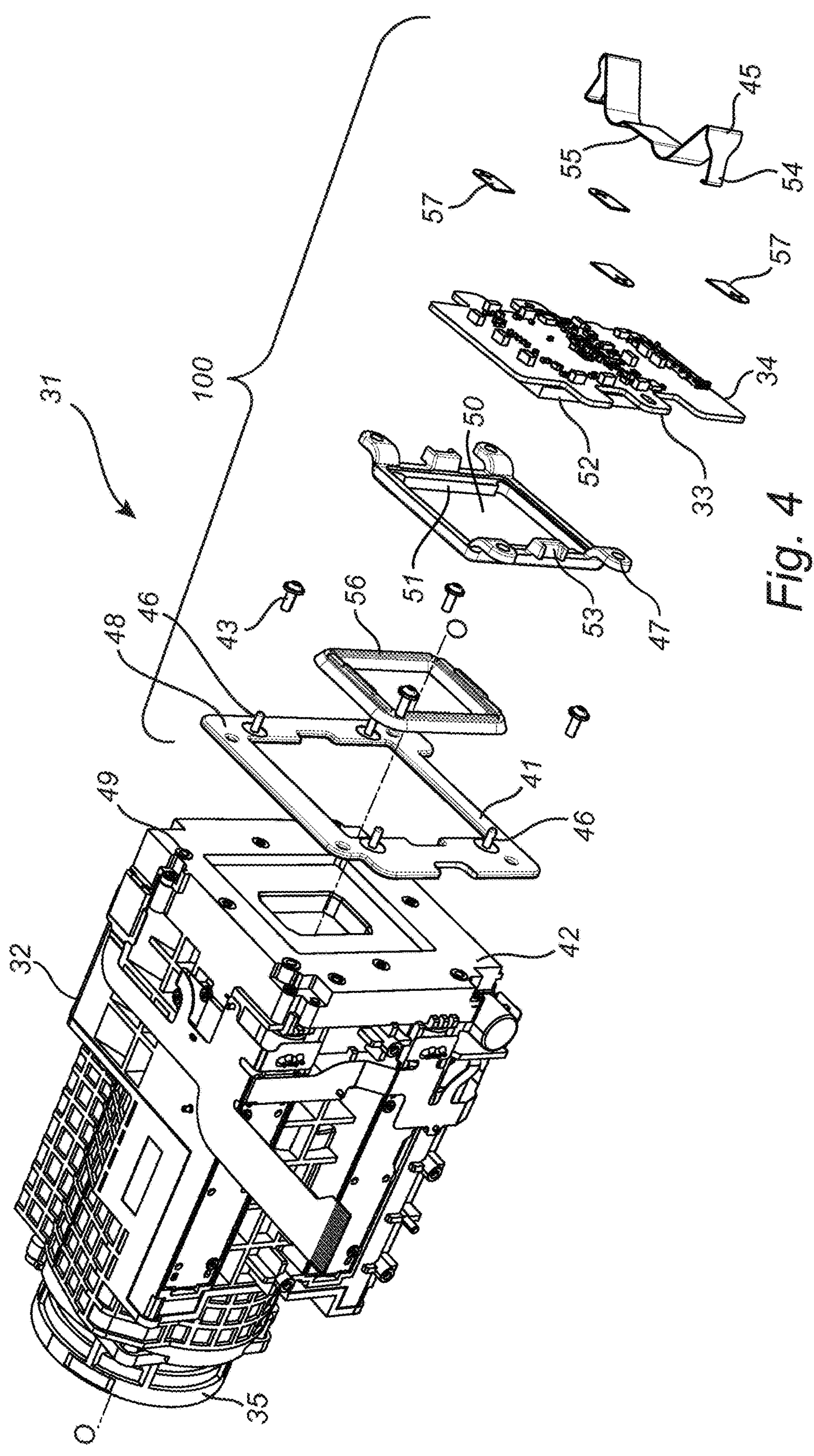
FIG. 4 is an exploded view of the imaging device of FIG. 3.
Figure 5:
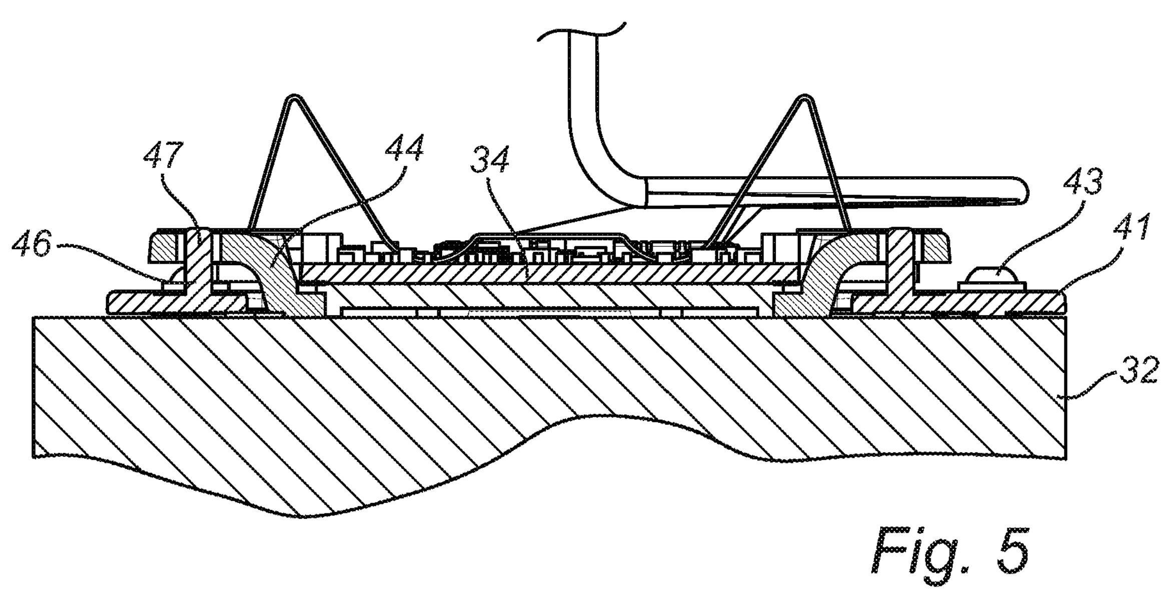
FIG. 5 is a sectional view and shows a section along line V-V in FIG. 3.

The inventors of the present invention have realised that there is yet another, better way of overcoming the problem of damage to the image sensor and the lens when reworking their attachment. With reference to FIGS. 3-5, embodiments of the invention will now be discussed. In FIG. 3, parts of a camera 31 are shown. Just like the prior art cameras in FIGS. 1 and 2, the new camera 31 has an optics unit 32 and an image sensor 33. The image sensor 33 is hidden in FIG. 3 but can be seen in FIG. 4. The image sensor 33 is carried by a PCB 34. In this embodiment, the optics unit 32 comprises a lens 35 of the integrated type used in the prior art camera in FIG. 2. However, the invention is equally applicable to cameras having a lens threaded into a lens holder, such as in the prior art camera in FIG. 1.

An attachment part 41, is releasably attached to a rear end surface 42 of the optics unit 32 by means of screws 43. The PCB 34 carrying the image sensor 33 is releasably attached to a sensor holder 44 by means of an attachment clip 45. The sensor holder 44 is only partially seen in FIG. 3, as it is sandwiched between the sensor PCB 34 and the attachment part 41 of optics unit 32. Thus, the sensor holder is arranged on a front side of the sensor PCB 34 and the image sensor 33, or in other words on a side of the PCB 34 and the image sensor 33 facing the optics unit 32. The sensor holder 44 is permanently attached to the attachment part 41 by means of gluing pins 46 of the attachment part 41 in through holes 47 in the sensor holder.

With reference to FIG. 4, the arrangement of the various parts of the attachment for the image sensor 33 to the optics unit 32 will now be explained in further detail. The attachment part 41 is a frame-like structure having through holes 48 through which the screws 43 are passed for threading into screw holes 49 in the rear end surface 42 of the optics unit 32.

The sensor holder 44 is a frame-like structure and has a central opening 50 arranged to fit around the image sensor 33. The central opening 50 provides a circumferential sensor holder abutment surface 51 which is arranged to abut a circumferential image sensor abutment surface 52 of the image sensor 33.

The sensor holder 33 has two grip surfaces 53 with which claws 54 of the attachment clip 45 can engage. The attachment clip 45 comprises a bent sheet metal body with a claw at each end and a pressure surface 55 therebetween. For releasably attaching the image sensor 33 to the sensor holder 44, the sensor holder 44 is placed surrounding the image sensor 33 on the PCB 34. The clip 45 is placed on the back of the PCB 34, with the claws extending around a respective edge of the PCB and engaging the grip surfaces 53 of the sensor holder 44. Thereby, the pressure surface 55 is pressed against the PCB 34 on the back of the image sensor 33, thus pressing the image sensor 33 against the sensor holder 44, ensuring engagement between image sensor abutment surface 52 and the sensor holder abutment surface 51.

The PCB 34 carrying the image sensor 33 and the attached sensor holder 44 are arranged on the attachment part 41 with the pins 46 extending through the through holes 47 in the sensor holder 44 (see FIG. 5 for a clearer view of this detail). A gasket 56 is sandwiched between the attachment part 41 and the sensor holder 44 such that a seal will be provided around the image sensor 33.

Using an active alignment process, the image sensor 33 is adjusted in position and angle in relation to the optics unit 32 until a satisfactory image is acquired. The image sensor 33 and the optics unit 32 are then attached to each other in that aligned position by permanently attaching the sensor holder 44 to the attachment part 41. In this example, the permanent attachment is effected by gluing the pins 46 of the attachment part 41 to stoppers 57 arranged surrounding the through holes 47 in the sensor holder on the backside of the sensor holder 44, i.e., on the side facing away from the optics unit 32.

During testing of the assembled camera 31, or later during operation, it may be discovered that there are defects in the camera 31. One cause of defects is blemishes on the image sensor 33. Image sensor blemishes may, e.g., appear if metal particles from the lens threads fall down on the image sensor 33. This may happen during manufacture of the camera or later, for instance when the camera 31 is handled during transportation or if it is subjected to vibrations after installation. Other causes of defects are incorrect sensor alignment, imperfect attachment, and malfunctioning components. Whatever the cause of the defects, it may be necessary to take the image sensor and optics unit apart again for removing the cause of the defects. If there are blemishes on the image sensor, it may, for instance, be possible to clean the image sensor and then reattach the image sensor to the optics unit. Similarly, an incorrect alignment or a faulty gluing may be redone, or malfunctioning components may be replaced. As discussed above, in prior art cameras, there is a risk of damaging the image sensor or the optics unit, or both. Thanks to the invention, it is possible to remove the image sensor 33 from the optics unit 32 without damaging them.

When it has been decided to detach the image sensor 33 from the optics unit 32, the clip 45 is manoeuvred to release its grip around the grip surfaces 53 of the sensor holder 44. Thereby, the sensor PCB 34 is released from the sensor holder 44, which also means that the image sensor 33 is released from the sensor holder 44. In the example shown in FIGS. 3-5, the sensor holder 44 is arranged between the sensor PCB 34 and the attachment part 41, making the clip 45 accessible even though the sensor holder has been permanently attached to the attachment part 41 of the optics unit 32, such that the sensor PCB 34 and thereby also the image sensor 33, can be removed from the sensor holder 44.

If there were blemishes on the image sensor 33, the image sensor can now be cleaned and then put back again.

It may in many cases be possible to just releasably reattach the image sensor 33 to the sensor holder 44 after cleaning. However, in some cases, the tolerances in the parts involved in the releasable attachment of the image sensor to the sensor holder are not strict enough to allow the image sensor 33 to simply be reattached to the sensor holder 44. Instead, a renewed alignment will generally be necessary. The permanent attachment of the sensor holder 44 to the attachment part 41 of the optics unit will therefore need to be broken up. However, since the sensor PCB 34 with the image sensor has been removed from the sensor holder 44, the sensor holder 44 can be forcibly removed from the attachment part 41 without risk of damage to the image sensor 33. Still, a risk of damage to the optics unit would be involved and it is therefore advisable to also remove the attachment part 41 from the optics unit 32. This can conveniently be done by unscrewing the screws 43 that were used for releasably attaching the attachment part 41 to the rear end surface 42 of the optics unit 32. When the sensor PCB 34 with the image sensor 33 has been removed from the sensor holder 44 and the attachment part 41 has been released from the optics unit 32, the glued-together sensor holder 44 and attachment part 41 can be discarded. If desired, e.g., for material recycling, the sensor holder 44 and the attachment part 41 may be forcibly broken apart.

If a fault in the optics unit or the image sensor was the cause of the defect, the faulty component can be replaced. If, for instance, sensor blemishes were the cause, the optics unit and the image sensor can be attached to each other again after cleaning of the image sensor. A new sensor holder and a new attachment part may be necessary for this, but these parts are generally much less expensive than the image sensor and the optics unit.

FIG. 4 is an exploded view of the camera 31 of FIG. 3. FIG. 4 may also be said to illustrate a kit of parts 100 for attaching the image sensor 33 to the optics unit 32 of the camera 31. The kit of parts 100 comprises the attachment part 41 and the sensor holder 44 necessary for releasably attaching the image sensor 33 and the optics unit 32 and for permanent attachment of the of the sensor holder 44 to the attachment part 41 as discussed above. Thus, the attachment part 41 is configured to be releasably attached to a sensor attachment surface 42 of the optics unit of the imaging device. In this example, the attachment part 41 has through holes 48 adapted for receiving screws 43 for releasable attachment to a rear end surface 42 of the optics unit 32. The sensor holder 44 is configured to be releasably attached to the image sensor of the imaging device. In the example shown, the sensor holder 44 has grip surfaces 53 with which the attachment clip 45 can engage for holding the sensor PCB 34 with the image sensor 33 in abutment against the sensor holder 44. The attachment part 41 and the sensor holder 44 are configured to be permanently attached to each other. In the example in FIG. 4, the attachment part 41 has protrusions in the form of pins 46 which are insertable in through holes 47 in the sensor holder 44. By means of the pins 46 and the through holes 47, the attachment part 41 and the sensor holder 44 can be glued or welded or in any other permanent way attached to each other. The sensor holder 44 is configured to be releasable from the image sensor when the attachment part 41 and the sensor holder 44 have been permanently attached to each other. In the example shown, this achievable by placing the sensor holder 44 between the sensor PCB 34 and the attachment part 41, such that the releasable attachment of the sensor PCB 34, and thereby the image sensor 33, is accessible even after the sensor holder 44 has been permanently attached to the attachment part 41.

Figure 6:
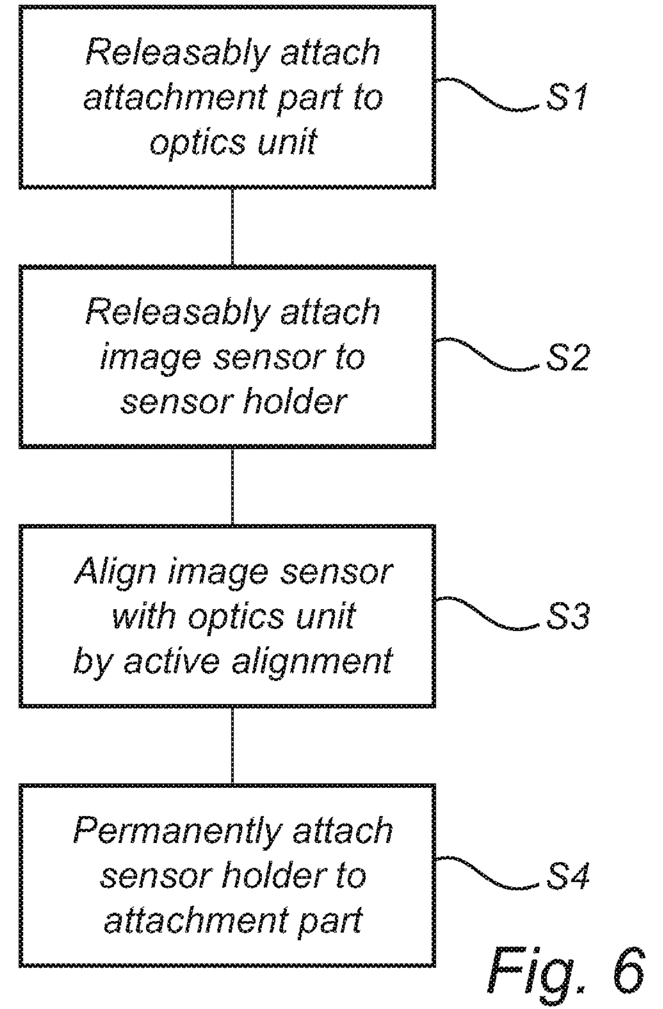
FIG. 6 is a flowchart outlining a method for attaching an image sensor to an optics unit of an imaging device.

A method by which the image sensor can be attached to the optics unit of an imaging device, such as a camera, will now be described with reference to the flow chart in FIG. 6, as well as to the exploded view in FIG. 4.

In step S1, the attachment part 41 is releasably attached to the sensor attachment surface 42 of the optics unit 32. In step S2, which may be performed before, after or in parallel with step S1, the image sensor 33 is releasably attached to the sensor holder 44. In step S3, using an active alignment method, a position of at least one of the image sensor 33 and the optics unit 32 is adjusted, such that the image sensor 33 is positioned at a desired angle in relation to an optical axis O-O of the optics unit 32 and in a desired position in relation to the optics unit 32, thereby positioning the image sensor 33 in an aligned position. In step S4, the sensor holder 44 is permanently attached to the attachment part 41, such that the image sensor 33 is fixed in the aligned position. The sensor holder 44 is arranged such that the image sensor 33 is releasable from the sensor holder 44 when the sensor holder 44 has been permanently attached to the attachment part 41.

It will be appreciated that a person skilled in the art can modify the above-described embodiments in many ways and still use the advantages of the invention as shown in the embodiments above. As an example, and as already mentioned above, the invention is not limited to cameras with optics units having integrated lenses, but is equally applicable to cameras having threaded lenses, such as the prior art camera shown in FIG. 1.

In the example described above, the sensor holder 44 is arranged between the sensor PCB 34 and the attachment part 41, making the sensor PCB 34 accessible for release from the sensor holder 44 even after the sensor holder has been permanently attached to the attachment part 41 on the optics unit 32. Such accessibility can be achieved also in other ways. For instance, the image sensor may be arranged between the sensor holder and the attachment part with, e.g., a clip holding the image sensor on the sensor holder accessible even if the sensor holder has been attached to the attachment par. In embodiments where there is sufficient distance between the attachment part and the image sensor for moving a detached image sensor, the image sensor can be removed after having been detached from the sensor holder.

The releasable attachment of the PCB 34, and thereby the image sensor 33, to the sensor holder 44 is in the example shown in the drawings performed using a spring biased clip 45. Other means for releasably attaching the sensor PCB 34 to the sensor holder are also feasible. For instance, the sensor PCB 34 may be attached to the sensor holder by means of screws or by a snap fit.

The attachment part 41 and the sensor holder 44 may be manufactured from metal or plastic. They may both be of one and the same material or they may be of different materials. If they are made from plastic, the plastic may be reinforced by fibres, such as glass fibres. Plastic parts may be manufactured by injection moulding, e.g., from polycarbonate or other thermoplastic. Metal parts may be made, e.g., from aluminium, and may be cast or milled.

Above, the permanent attachment of the sensor holder 44 to the attachment part 41 has been described as being performed by gluing with UV-curing glue. However, other permanent attachment methods may be used instead. For instance, heat curing glue or welding may be used.

The attachment interface between the sensor holder and the attachment part may be formed in many different ways. In the example shown in the drawings, optics attachment features in the form of pins are provided on the attachment part and sensor attachment features in the form of through holes are provided in the sensor holder. This arrangement could be reversed if a thicker attachment part is used, providing holes in the attachment part arranged to receive pins on the sensor holder. Other protrusions and recesses or openings may also be used. For example, the pins could be replaced by lower, wider bumps arranged to be received in shallow recesses in the other part. Deeper recesses, such as the glue cups shown in FIG. 2 could also be used. The attachment interface may in some embodiments be formed without any recesses and protrusions, providing flat surfaces to which glue lines are applied.

Thus, the invention should not be limited to the shown embodiments but should only be defined by the appended claims.

The invention claimed is:

1. A method for attaching an image sensor to an optics unit of an imaging device, the method comprising the steps of:

releasably attaching an attachment part to a sensor attachment surface of the optics unit, releasably attaching the image sensor to a sensor holder, wherein the sensor holder is positioned in relation to the image sensor by abutting an image sensor abutment surface of the image sensor against a sensor holder abutment surface of the sensor holder, the image sensor abutment surface being a circumferential surface of the image sensor, using an active alignment method, adjusting a position of at least one of the image sensor and the optics unit, such that the image sensor is positioned at a desired angle in relation to an optical axis of the optics unit and in a desired position in relation to the optics unit, thereby positioning the image sensor in an aligned position, permanently attaching the sensor holder to the attachment part, such that the image sensor is fixed in the aligned position, wherein, the image sensor is releasable from the sensor holder when the sensor holder has been permanently attached to the attachment part.

2. The method according to claim 1, wherein releasably attaching the image sensor to the sensor holder comprises releasably attaching the sensor holder to a side of the image sensor arranged to face the optics unit.

3. The method according to claim 1, wherein the attachment part is attached to the optics unit by means of screws, snap fit, or a spring biased attachment device.

4. The method according to claim 1, wherein the image sensor is carried by a PCB and wherein the image sensor is attached to the sensor holder by releasably attaching the image sensor PCB to the sensor holder.

5. The method according to claim 1, wherein the image sensor is attached to the sensor holder using a spring biased attachment device.

6. The method according to claim 1, wherein permanently attaching the sensor holder to the attachment part comprises gluing or welding a sensor attachment feature of the sensor holder to an optics attachment feature of the attachment part.

7. The method according to claim 6, wherein the sensor attachment feature comprises a through hole or recess in the sensor holder, and wherein the optics attachment feature comprises a protrusion on the attachment part.

8. An imaging device comprising:

an image sensor, an optics unit, an attachment part releasably attached to a sensor attachment surface of the optics unit, a sensor holder to which the image sensor is releasably attached, wherein, the sensor holder is permanently attached to the attachment part, such that the image sensor is fixed in an aligned position in relation to the optics unit, and the image sensor is releasable from the sensor holder when the sensor holder is permanently attached to the attachment part, whereby the sensor holder is positioned in relation to the image sensor by abutting an image sensor abutment surface of the image sensor against a sensor holder abutment surface of the sensor holder, the image sensor abutment surface being a circumferential surface of the image sensor.

9. The imaging device according to claim 8, wherein the sensor holder is arranged between the image sensor and the optics unit.

10. The imaging device according to claim 8, wherein:

the attachment part comprises a plurality of screw holes for releasable attachment to the sensor attachment surface of the optics unit, the sensor holder comprises a plurality of grip surfaces for releasable attachment to the image sensor.

11. The imaging device according to claim 8, wherein:

the attachment part comprises a protrusion, the sensor holder comprises a through hole or recess, and the protrusion is arranged in the through hole or recess and permanently attached thereto.

12. The imaging device according to claim 8, wherein the sensor holder is attached to the attachment part by gluing or welding.

* * * * *